Figure 1:
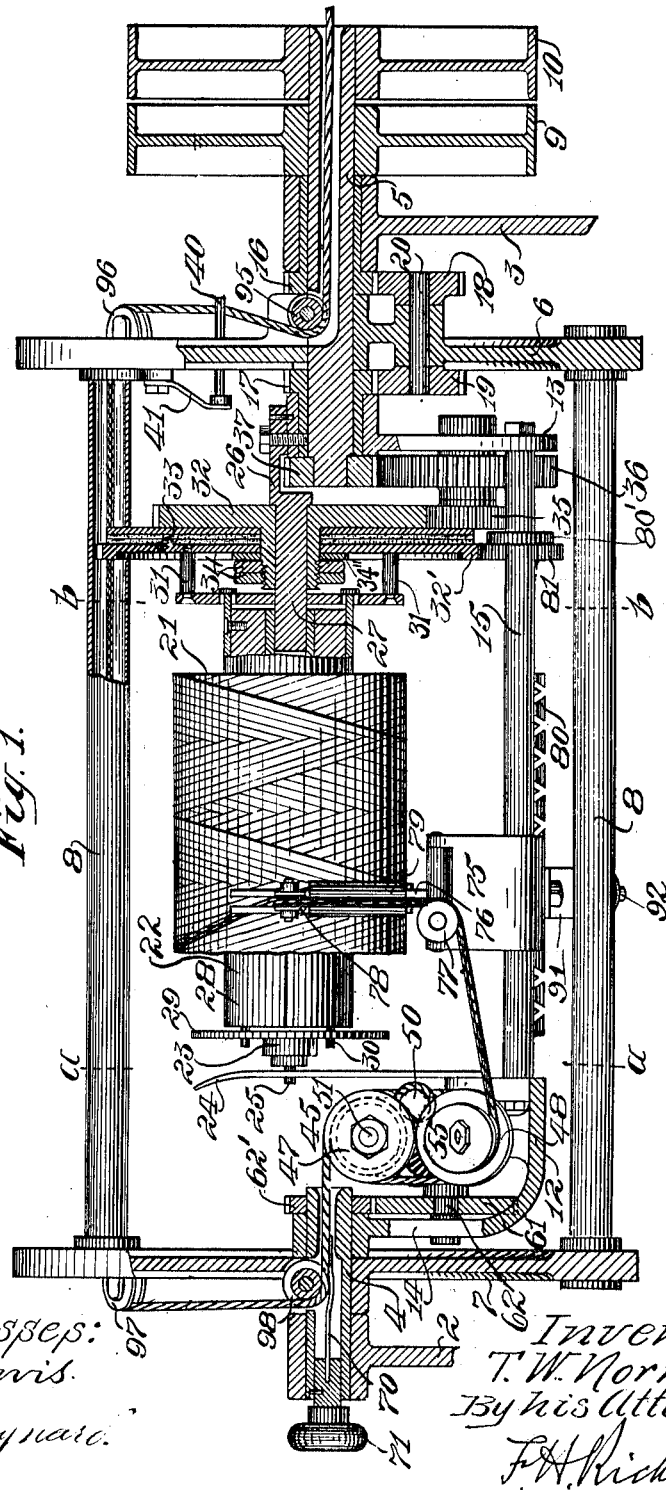

T. W. NORMAN.
CORD OR ROPE MAKING MACHINE.
APPLICATION FILED APR. 17, 1903.

1,031,367.

Patented July 2, 1912.
3 SHEETS—SHEET 1.

Witnesses:
C. A. Jarvis.
F. E. Maynard.

Inventor:
T. W. Norman.
By his Attorney,
F. H. Richards.

T. W. NORMAN.
CORD OR ROPE MAKING MACHINE.
APPLICATION FILED APR. 17, 1903.

1,031,367.

Patented July 2, 1912.

3 SHEETS—SHEET 2.

Witnesses:
C. A. Jarvis.
F. E. Maynard.

Inventor:
T. W. Norman.
By his Attorney,
F. H. Richards.

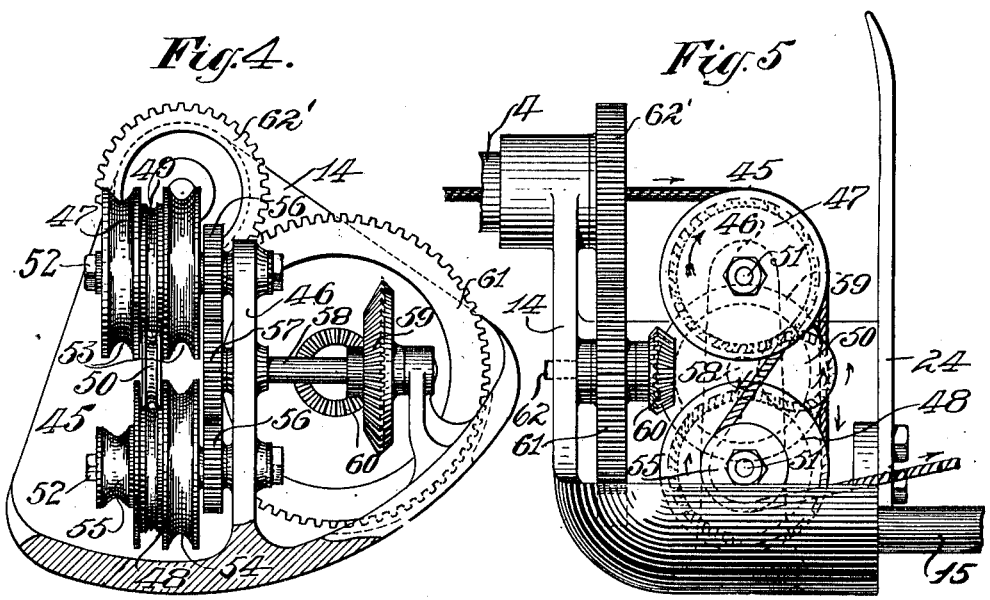
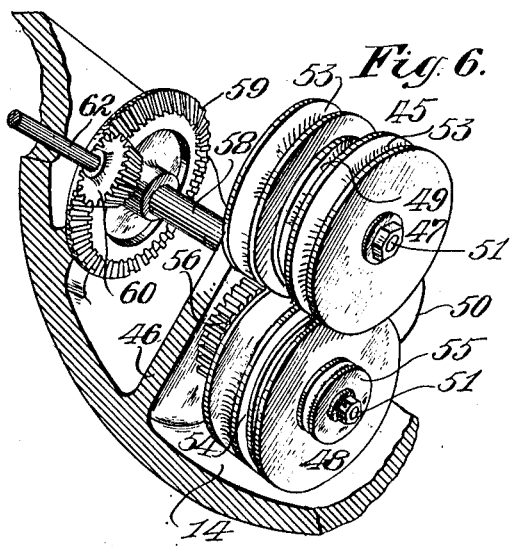

UNITED STATES PATENT OFFICE.

THOMAS WOOD NORMAN, OF NEWTON, MASSACHUSETTS.

CORD OR ROPE MAKING MACHINE.

1,031,367.  Specification of Letters Patent.  Patented July 2, 1912.

Application filed April 17, 1903. Serial No. 153,004.

*To all whom it may concern:*

Be it known that I, THOMAS WOOD NORMAN, a subject of the King of Great Britain, residing in Newton, in the county of Middlesex and State of Massachusetts, have invented certain new and useful Improvements in Cord or Rope Making Machines, of which the following is a specification.

This invention relates to rope and cord making machines, and more particularly to that part thereof which is designated as the take-up mechanism; the object of the invention being to provide an improved mechanism of this character having many superior features to the mechanism now in use for a similar purpose.

Another object of the invention is to provide an improved flier and feed mechanism effective to give two twists to the cord or rope for each revolution of the parts, being so organized that such flier and feed may be driven by a single driving means.

Another object of the invention is the provision of improved pull-down mechanism located in the interior of the flier to maintain a positive feed and uniform pulling-down of exactly the same extent of twisted rope for every repetition of a specified number of rotations of the pull-down capstans and for every corresponding number of twisting revolutions of the flier.

Another object of the invention is to provide improved mechanism for rotating the reel or drum at a variable speed.

Another object of the invention is to provide means operative to notify the operator when the reel becomes filled thereby to produce a rope or cord ball of any desired size or weight and to secure safety when the spool is full.

Another object of the invention is to provide improved means for shifting the belt when the cord breaks.

Another object of the invention is to provide improved means for laying up the cord upon the reel.

Another object of the invention is to provide improved pull-down mechanism, operative by, and the speed of which is controlled by the flier.

Another object of the invention is the provision of an improved organization in which the pull-down mechanism while located within the flier is maintained against rotary movement therewith, two twists being given to the cord for each revolution of the flier.

Another object of the invention is to provide improved means for smoothing the cord or rope during its twisting movement.

Another object of the invention is to provide improved pull-down mechanism in which its driving means may be readily and quickly changed and reversed when the flier is reversed.

The various mechanism constituting the present organization are particularly designed to be driven from one point, preferably by a belt, and the various mechanisms are shown located interiorly of the take-up flier and receive motion therefrom, the structure being in part an improvement on that shown and described in my Patent No. 723,178, dated March 17, 1903.

Figure 2:
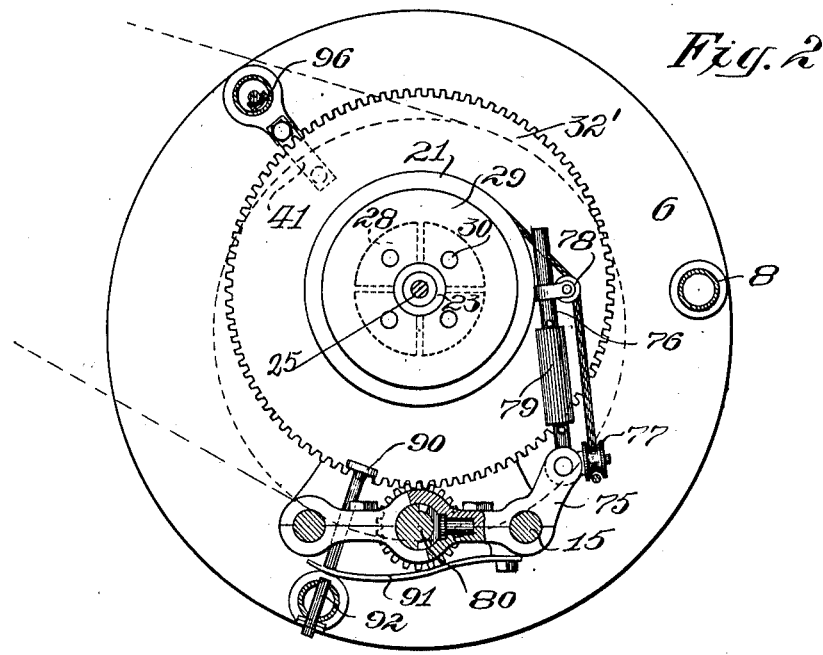
Figure 3:
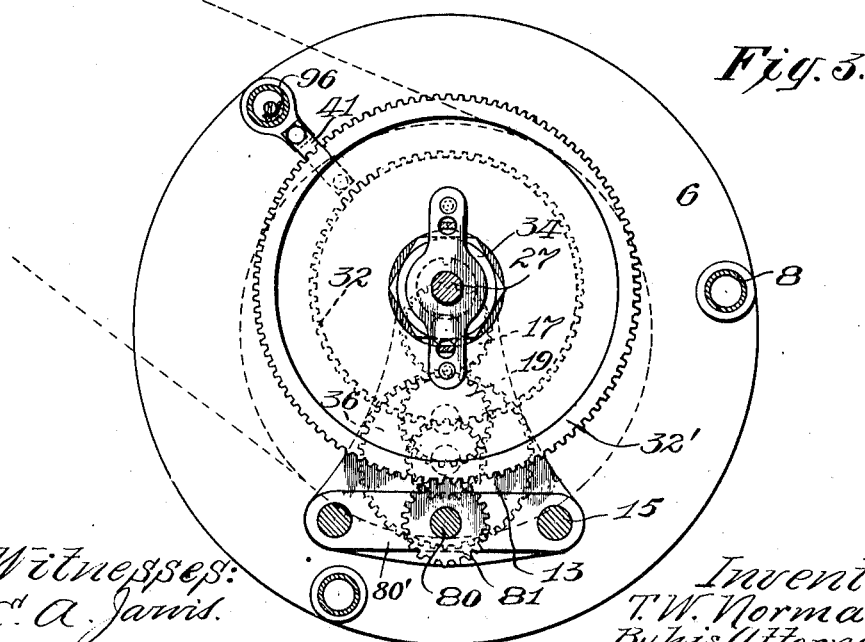

In the drawings accompanying and forming part of the specification, Figure 1 is a longitudinal sectional view of this improved take-up mechanism. Fig. 2 is a cross-sectional view thereof taken in line $a$—$a$, Fig. 1 looking toward the right. Fig. 3 is a cross-sectional view thereof taken in line $b$—$b$, Fig. 1, looking toward the right. Fig. 4 is a peripheral view of the pull-down mechanism and one end of the cradle upon which it is located as viewed from the interior of the flier. Fig. 5 is a side view of a portion of cradle and pull down mechanism, and Fig. 6 is a perspective view of such mechanism, the cradle being shown in section.

Similar characters of reference indicate corresponding parts in the different figures of the drawings.

Journaled in standards 2 and 3 of the frame work, which may be of any suitable design and structure, is a pair of tubular shafts 4 and 5 respectively, carrying flier heads 7 and 6 connected by suitable members, preferably in the form of tubes 8 through one of which the cord or rope passes and which heads and tubes constitute the flier of the take-up mechanism. To this flier motion is imparted, in the present instance, by a belt and for this purpose fast and loose pulleys 9 and 10 are mounted upon one of the shafts as for instance the shaft 5.

Depending within the flier and extending longitudinally thereof is a cradle 12 of any suitable construction adapted for the purpose. It comprises in the present instance a pair of depending segmental shaped arms 13 and 14 connected by rods or bars 15. To maintain this cradle stationary, that is to say, to prevent rotation thereof, suitable means are provided, shown in the present instance as planet gearing, one member 16 of which is fixed to the frame, and another member 17 being fixed to the hub of the cradle, said members being of one size and respectively in mesh with pinions 18 and 19 fast upon a shaft 20 journaled in the end of the flier. By this organization the rotary movement of the flier is not imparted to the cradle, although it is suspended directly from the shafts of such flier. Located within the flier is a take-up drum, spool, reel or collapsible bobbin 22 carried by a spindle 23, one end of which is maintained in position by a suitable spring arm 24, having an opening engaging a pin 25 of said spindle, and which arm is carried by the cradle. The other end of said bobbin is maintained in position by means of a bracket 26 secured at one end to the cradle hub and having a part formed as a stub shaft 27, the free end of which projects into the bobbin spindle. This bobbin is split for a portion of its length to form sections 28 which may be compressed to permit the removal of the coil or ball 21 therefrom. The sections of the bobbin are maintained in their normal frictional engagement with coils by a suitable disk 29 carrying pins 30, each of which engages an opening in one section, thus maintaining the sections in their spread position. For rotating this bobbin or spool it is shown connected by suitable studs 31 with a friction disk 32' having teeth upon its periphery, and which disk is loosely mounted upon the hub of a gear 32 journaled upon the stub shaft 27 and between which gear and the geared friction disk may be located friction members or disks 33. The frictional engagement of these disks relatively to each other is regulated by suitable nuts 34, one a check nut, carried by the threaded hub of the gear 32 and between which gear and nuts is located a washer 34". This gear 32 is in mesh with a pinion 35 supported on the depending arm 13 of the cradle and fixed to which pinion 35 is a spur gear 36 in mesh with a similar gear 37 carried by the end of the flier shaft 5. By this organization, upon the rotation of the flier by means of the fast pulley and its belt, motion is imparted to the geared friction disk, and thereby to the bobbin, or spool mounted thereon, the friction disks being effective to permit the speed of the spool and its bobbin to decrease as the diameter thereof increases. To stop the machine, should the cord or rope break, suitable belt shifting mechanism may be provided, which, in the present instance, comprises a reciprocatory arm 40 the end of which engages the cord. This arm projects through the head of the flier, its inner end being engaged by a spring 41 carried by the flier. The cord or rope which passes through the opening in the arm holds such arm in position against the spring. On the breakage of the cord a suitable belt shifter, not shown, may be operated as the spring shifts the arm outward, thereby to throw the belt from the fast to the loose pulley.

To insure a positive feed of the cord to the take-up bobbin and a uniform and accurate twist foot for foot, a pull-down mechanism 45 is provided which, in the present instance, is carried and geared interiorly of the flier and is stationarily disposed with relation thereto, it being shown carried by the cradle. This pull-down structure is mounted upon a post 46 of the cradle, and comprises a pair of grooved rolls or capstans 47 and 48 spaced apart, each roll in the present instance, being formed to provide a track 49 for a bodily movable sheave or roll 50 which pinches the cord relatively to the rolls 47 and 48. This roll 50 is maintained in position by the cord or rope which passes over and partially around such roll, that is, it straddles the roll. Each roll 47 and 48 is carried by a spindle 51 mounted upon the post and maintained upon such spindle by suitable nuts 52 whereby such rolls may be readily removed to permit the gears 56 and 57 to be changed, when it is desired to change the speed of the rolls. In the form shown the roll 47 is provided with a pair of peripheral grooves 53 for the reception of the cord or rope intermediate of which a track 49 is formed for the pinching sheave 50. The other roll has a single groove 54 and a similar track for the sheave and at one side thereof there is located a small loosely mounted grooved roll 55. For imparting motion to the rolls 47 and 48, the hub of each carries a pinion 56 in mesh with a pinion 57 carried upon a shaft 58 the other end of which has secured thereto a bevel gear 59 in mesh with a bevel gear 60 the hub of which is fixed to a spur gear 61. Both of these gears 60 and 61 are journaled upon a stub shaft 62 carried by the cradle arm 14 and the spur gear 61 is in mesh with a similar gear 62' fixed to the flier shaft 4 so that as the flier rotates the capstans will be rotated to pull down the cord or rope. The capstans are shown with their axes transverse to the axes of the flier. This pull-down mechanism is, owing to its organization, positively acting, that is, its organization is such that it pulls down the cord in a uniform manner. The cord passes only once around any one roll yet there is no slippage of such cord so that there is a uniform pulling down of exactly the same extent of twisted rope for every repetition of a specified number of rotations of the pull down capstans and for every corresponding number of twisting revolutions. This positive action of the pull-down is due to the provision of the bodily movable roll and the wedging action thereof. In other forms of pull-downs, it is necessary to pass the cord around each capstan several times so as to provide sufficient frictional contact to avoid as far as possible this slippage. But the passing of the cord around the capstans is not sufficient to insure a uniform and accurate pulling down of the cord as there is still some slippage.

For smoothing the cord or rope as it passes to the pull-down from the flier, suitable means is provided, shown in the present instance as a spring arm 70 technically known as a "slicker," extending lengthwise of the cord as it passes through the flier shaft and which in practice may be half round or concave. This arm is carried by a knob 71 having a part fitted into the end of the tubular flier shaft and presses against the rope or cord at the point adjacent to where the second twist is given thereto, thus it is in position for smoothing, compressing and shaping the fibers of the cord or rope and permitting smoother cord to be spooled. This slicker is removable to permit the threading of the machine its knob being provided with a pin entering a slot in the flier shaft to prevent the turning of the slicker.

For laying up the cord or rope upon the spool or drum, suitable means are provided which, in the present instance, comprises a carriage 75 reciprocally mounted upon the bars 15 of the cradle and carrying at one side a swinging finger 76 the upper end of which is bifurcated, the members of which bifurcated part are resilient to readily permit the passage of a knot or imperfection in the cord or rope. Suitable guiding means are provided for the cord, comprising a pair of rolls, one as 77 located with its axis transverse to the axis of the bobbin adjacent to the lower end of the finger, and the other as 78 adjacent to the free end thereof. This finger is provided with a relatively long roll 79 extending lengthwise thereof, which as the ball becomes filled acts to relieve the pressure against such ball. This roll 79 may be mounted on the finger in any suitable manner to maintain its position; for instance, collars or pins could be located above and below said roll, or various mechanical expedients could be used. This laying-on finger is held against the ball by the pull of the cord. For imparting reciprocal movement to this carriage a reverse worm shaft 80 is mounted in the cradle, a bearing 80', carried by one of the rods 15, being provided therefor at one end, such worm shaft passing through the carriage, and to which motion is imparted by a gear 81 mounted upon the end thereof which is in mesh with the teeth of the friction disk 32' so that the means which imparts motion to the bobbin 22 also imparts motion to the worm shaft. These gears may be formed with a suitable multiple of teeth, which will enable the cord or rope to be wound upon the bobbin with a bias or other desired wind, as is more particularly set forth in my co-pending application, Serial No. 95,153 filed February 24, 1902.

To notify the operator when the ball has reached a predetermined size or weight, suitable means is provided. This means in the present instance is in the form of a signaling device, and comprises a spring pressed plunger 90 carried by the carriage 75 with its end in position to engage the periphery of the bobbin as it is wound, so that when the same reaches a predetermined size this plunger will be shifted into position to move its spring 91 into position to shift the bolt 92 carried by the flier which may sound a gong or operate to shift the belt and stop the machine, or to perform both of these functions if desired. It will of course be obvious that when each ball has reached a certain diameter, the spring 91 will always be in position to engage the bolt 92.

The cord or rope passes to the flier through the tubular shaft 5 thereof where it gets its first twist and around a suitable guide roll 95 located in an opening of the hub of the flier, and from thence to a similar guide roll 96 carried adjacent to the periphery of such flier, intermediate which guides it engages the reciprocating arm 40 hereinbefore described. From the guide roll 96 it passes through the tubular shaft of the flier to a similar guide roll 97 located upon the other head of the flier, and from thence to a guide roll 98 mounted in an opening in said flier head, prior to which it has received one of its twists, as hereinbefore described. From thence it passes to the periphery of one of the capstans 47 of the pull-down, it being maintained "taut" and straight with the flier shaft by such capstan which is so located that its periphery is in alinement with the axes of the flier, the cord receiving its second twist between the guide roll 98 and the capstan 47. The cord passes partly around the periphery of this capstan, thence to its companion capstan 48, thence to the rear of capstan 48 and entering track 49 of the capstan 48, thence to the bodily movable sheave or roll 50, straddling the same and thence entering the other track of the capstan 48, thence to the outer groove of the capstan 47 and thence to the loosely mounted roll 55 and around the same, and from thence to the guide roll 77 of the carriage, from which point it passes to the guide roll located upon the laying on finger, and is then laid upon the bobbin.

The amount of twist put in the cord depends upon how fast the capstans 47 and 48 are driven and when it is desired to change the twist the spur gears 56 and 57 which impart motion to the capstans may be changed for gears of a different size, for which purpose the capstans are shown as readily removable from the cradle, there being supporting framework at one side only of such capstans. The first twist is given to the cord as it enters the flier at the point where it passes to the guide roll 95 located in the flier shaft, the second twist being given at a point between the guide roll 98 and the capstan roll 47 and at which roll 98 the slicker is located to smooth down the fibers of the cord.

By the provision of bevel gearing for rotating the capstans it will be readily seen that if for any reason the flier is reversed to give a different twist the original rotation of the capstans can be maintained by changing the position of bevel gear 59 so that the back of the gear will face toward the pull-down roll and thus mesh with the opposite side of the bevel pinion 60. This reversal or changed position of the bevel gear 59 secures the desired operation of the pull-down on the reversal of the flier. In this mode of operating the mechanism the cord may be fed under the ball, the cord leading downward instead of upward, in which case a somewhat shorter finger 76 may be used if necessary.

From the foregoing it will be seen that the take-up flier receives and delivers the cord axially of itself, delivering the cord to a geared pull-down which feeds the same uniformly to the bobbin maintaining a positive feed and an accurate twist foot for foot as the cord is fed forward, such cord receiving two twists for each revolution of the flier. It will also be seen that one driving member imparts motion to the flier, which in turn imparts motion to the rotary drum, to the reciprocatory carriage, and to the pull-down mechanism, all of which mechanisms are located within the flier, thus providing a very compact and efficient take up mechanism, in which the cord is fed forward uniformly, and is wound only as fast as it is fed to the drum.

It is to be understood that the various details may be more or less changed without departing from the spirit or scope of my invention, and that the term " cord " as used herein and in the claims is to be understood to include yarn, twine, rope and other kinds of cordage, and that the term bobbin, spool, drum or reel includes any suitable device for reeling the cord, this explanation being made to avoid unnecessary repetition of words in the claims.

Having thus described my invention, I claim—

1. A take-up mechanism comprising a rotary flier, a cradle located within said flier, and a positively acting pull-down mechanism carried by said cradle for feeding cord uniformly to the bobbin.

2. A take-up mechanism comprising a rotary flier, a cradle located within said flier, means for holding said cradle against rotation, and pull-down mechanism carried by said cradle.

3. A take-up mechanism comprising a rotary flier, pull-down mechanism located within said flier and means including gearing for holding said pull-down mechanism stationary against rotation with the flier.

4. A take-up mechanism comprising a rotary flier, a cradle located within said flier, planet gearing for holding said cradle stationary, pull-down mechanism carried by said cradle and means for imparting movement to said pull-down mechanism from the flier.

5. A take-up mechanism comprising a rotary flier having a pair of tubular journals through which the cord passes to and from the flier, pull-down mechanism located within the flier and stationary with relation thereto and comprising rolls one of which is located adjacent to one of such journals in such manner that the cord is maintained in substantial alinement with such journal as it passes therefrom.

6. The combination of a rotary flier, a cradle located longitudinally thereof, a pull-down mechanism carried by said cradle and comprising rolls having their axes of rotation located transverse to the axis of rotation of said flier.

7. The combination of a rotary flier, a stationary cradle located longitudinally thereof, a pull-down mechanism carried by said cradle and comprising rolls having their axes of rotation located transverse to the axis of rotation of said flier the periphery of one of said rolls being adjacent to the axis of rotation of said flier.

8. The combination of a rotary flier, a stationary cradle located therein and extending longitudinally thereof, positively acting means for maintaining said cradle stationary, a pull-down supported on said cradle, and gearing for imparting motion to said pull-down, one member thereof being carried by the flier.

9. The combination of a rotary flier having a two-part shaft, a cradle supported within said flier, planet gearing for maintaining said cradle stationary, pull-down mechanism supported on said cradle, a gear carried by one part of said flier-shaft and a gear carried by said cradle and in mesh with said flier-shaft gear for imparting motion from the flier to the pull-down mechanism.

10. The combination of a rotary flier, a cradle supported therein, pull-down mechanism supported thereon, and gearing for imparting motion from the flier to the pull-down mechanism and embodying a pair of bevel-gears.

11. A pull-down mechanism comprising a pair of capstans or rolls spaced apart, each having a track and a roll mounted in such track for bodily movement in or out between the two capstans or rolls, the cord straddling such bodily movable roll.

12. A pull-down comprising a pair of grooved rolls or capstans spaced apart, each having a track and a roll mounted in said track for bodily movement in or out between the two capstans or rolls, the cord straddling such bodily movable roll.

13. A pull-down comprising a pair of grooved rolls spaced apart, each having a track and a bodily movable grooved roll in position adjacent to said track, the cord straddling said bodily movable roll.

14. A pull-down comprising a pair of rolls spaced apart, a loosely mounted roll at the side of one of said rolls, and an intermediate roll mounted for bodily movement in or out between said pair of rolls, the cord straddling such bodily movable roll.

15. A pull-down comprising a pair of rolls spaced apart, each having a track, a loosely mounted roll at the side of one of said rolls, and an intermediate roll mounted in said track for bodily movement in or out between said pair of rolls, the cord straddling such bodily movable roll.

16. A pull-down mechanism comprising a pair of rolls spaced apart, one of such rolls having a pair of grooves and the other a single groove, a loosely mounted roll adjacent to the latter roll and an intermediate roll mounted for bodily movement in or out between said pair of rolls, the cord straddling said bodily movable roll.

17. A pull-down mechanism comprising a pair of rolls spaced apart, one of such rolls having a pair of grooves, and the other a single groove, and each having a track on one side of a groove, a loosely mounted roll adjacent to the latter roll and an intermediate roll mounted in said tracks for bodily movement in or out between said pair of rolls, the cord straddling said bodily movable roll.

18. A pull-down mechanism comprising a pair of positively driven rolls spaced apart, a loosely mounted roll on one side of one of said rolls and an intermediate roll mounted for bodily movement between said pair of rolls, the cord straddling said bodily movable roll.

19. The combination of a rotary flier, a stationary cradle located therein, positively acting means for maintaining said cradle stationary, a pull-down structure mounted on said cradle and receiving motion from said flier, and a spool or drum located within said flier and frictionally rotated therefrom.

20. The combination of a rotary flier, a spool or drum located therein and frictionally rotated; and a positively acting pull-down mechanism located within said flier and rotated thereby.

21. The combination of a rotary flier, a rotary drum, located therein and frictionally rotated by said flier, a cradle within the flier; gearing in gear with the flier for holding the cradle stationary, a pull-down also geared to the flier and carried by said cradle for feeding cord at a uniform speed to the drum, the organization being such that two twists are given the cord for each revolution of the flier.

22. The combination of a double twist take up flier mechanism, and means for smoothing down compressing and shaping the product at the point where the second twist is put in such product.

23. The combination of a double twist take up flier mechanism, in which the flier has a tubular journal projecting into said flier and through which the product passes, and means located adjacent to said journal for smoothing, compressing and shaping the product.

24. The combination of a double twist take up flier mechanism, in which the flier has a tubular journal through which the product passes, and means carried within said journal for smoothing down, compressing and shaping the product.

25. The combination of a double twist take up flier mechanism, in which the flier has a tubular journal through which the product passes, and removable means carried by said journal for smoothing down, compressing and shaping the product.

26. The combination of a double twist take up flier mechanism, a spool carried within the flier, and pull-down mechanism within said flier, the second twist being given the product between the point where it leaves the flier and the pull-down mechanism, and means engaging the product where the second twist is put in for smoothing down, compressing and shaping the product.

27. The combination with a rotary flier, of a stationary cradle located within said flier, means for maintaining said cradle stationary, pull-down mechanism carried by said cradle, the organization being such that a second twist is given to the product during each revolution of the flier, and means positioned at the point where the second twist is given to the product for smoothing down, compressing and shaping the product at said point.

28. The combination with a double twist take up flier mechanism, of resilient means for smoothing down, compressing and shaping the product at the point where the second twist is put in the product.

29. The combination with a flier, of means for rotating the same comprising a fast and a loose belt pulley; a belt shifting member operative on the breakage of the cord and comprising a reciprocatory arm in engagement with said cord, one end thereof located interiorly of the flier; and a spring carried by said flier and in engagement with said reciprocatory arm.

30. The combination with a rotary flier, of a cradle located therein, means for holding said cradle stationary, pull-down mechanism carried by said cradle, and a spool or drum located within said flier, the mechanism being organized to give two twists to the cord for each revolution of the flier, and means in position within said flier to engage the periphery of the spool and operative at a predetermined period to indicate that the spool has reached a predetermined size.

31. The combination of a rotary flier having a shaft, a spool or drum located within the flier; and means for frictionally imparting motion to said spool or drum and comprising a gear carrying friction-disks, one of which has gear teeth; a gear mounted upon said shaft, gearing in mesh with said friction-disk carrying gear and shaft gear, and means carried by the first said latter gear for regulating the resistance of said friction disks relatively to each other.

32. The combination with a rotary flier, of a drum or spool located therein; means for imparting motion to said drum or spool and comprising gearing, one member thereof rotated by the flier, and another member thereof carrying friction disks, one disk having external gear-teeth, a worm-shaft; a reciprocatory carriage located thereon for laying the cord on to the drum or spool; and a gear carried by said shaft and in mesh with the gear-teeth on such friction-disk.

33. The combination with a rotary flier, of a drum or spool located therein; means for imparting motion to said drum or spool and comprising gearing, one member thereof rotated by the flier, and another member thereof carrying friction-disks, one having external gear-teeth; a worm-shaft; a reciprocatory carriage located thereon for laying the cord on to the drum or spool; and a gear carried by said shaft and in mesh with the gear-teeth of said toothed friction-disk, said friction-disk and worm-shaft gear having a proper ratio of teeth so that a bias wind will be imparted to the cord.

34. The combination with a rotary flier, of a rotary spool or drum frictionally driven from said flier whereby the speed thereof decreases as the diameter thereof increases; and means carried within the flier for positively feeding the cord at a uniform rate of speed with relation to the varying speed of the drum.

35. The combination with a rotary flier, of a spool or drum located therein and rotatable at a variable speed; a cradle also located within such flier; means for holding said cradle against rotation and means carried by said cradle for feeding the cord to the drum at a uniform rate of speed with relation to the variable speed of the drum.

36. The combination with a rotary flier, of a drum located longitudinally thereof; a cradle supported within said flier and also extending longitudinally thereof; means for maintaining such cradle stationary; means for imparting movement to said drum and effective to permit the speed thereof to be varied; and means carried by said cradle for feeding the cord at a predetermined rate of speed with relation to the variable speed of the drum.

37. The combination with a rotary flier, of a drum located longitudinally thereof; a cradle supported within said flier and also extending longitudinally thereof; planet gearing for maintaining said cradle stationary; means for imparting movement to said drum and effective to permit the speed thereof to be varied; and means carried by said cradle for feeding the cord at a predetermined rate of speed with relation to the variable speed of the drum.

38. The combination with a rotary flier adapted to receive and deliver the cord axially of itself; a rotary drum or spool located therein; means for imparting movement to said drum or spool and effective to permit the speed thereof to be varied; a cradle located within said flier; means for maintaining the cradle stationary; and means carried by the cradle for feeding the cord to the drum at fixed rate of speed with relation to the variable speed of said drum.

39. The combination with a rotary flier adapted to receive and deliver the cord axially of itself; a rotary spool or drum located therein; a cradle located within the flier; and means carried thereby for feeding the cord at a predetermined rate of speed with relation to the speed of the drum and having a roll positioned with its axis transverse to the axis of the flier and located adjacent to the journal of said flier to receive the cord therefrom.

40. A pull-down structure comprising rolls spaced apart; spindles for said rolls; supporting means located at one side only of said rolls for carrying said spindles, whereby said rolls may be readily removed from said spindles at the free ends thereof; and an intermediate roll bodily movable between said rolls and which the cord straddles.

41. A pull-down structure comprising a pair of rolls spaced apart, each having a track; spindles for said rolls; supporting means for said spindles and located at one side only of said rolls, whereby the rolls may be readily removed from said spindles; and an intermediate roll bodily movable between said pair of rolls and which the cord straddles.

42. The combination with a rotary flier, of a spool or drum located therein, a stationary cradle also located therein, a reciprocating carriage mounted on said cradle, a swinging device carried by said carriage, and guiding means comprising a pair of rolls located one adjacent to each end of said device, the axis of one roll being transverse to the axis of the other roll, the position of said device being controlled entirely by the tension of the cord.

43. The combination of a rotary flier, a rotary spool or drum located therein, laying-on means comprising a reciprocatory carriage and a swinging device carried thereby, the position thereof with relation to the drum being controlled entirely by the tension of the cord, said swinging device having a roll extending lengthwise thereof and effective to offset friction on the ball.

44. The combination of a rotary flier, a rotary spool or drum located therein, laying-on means comprising a reciprocatory carriage and a swinging device carried thereby, the position thereof with relation to the drum being controlled entirely by the tension of the cord, said swinging device having a roll extending lengthwise thereof and effective to offset friction on the ball, and a pair of guiding devices carried by said laying on means one having its axis transverse to the axis of the other.

45. The combination with a single rotary flier, of belt mechanism for rotating said flier; a take up spool or drum located within said flier; a stationary cradle likewise located within said flier; means for holding said cradle stationary; a positively acting pull-down mechanism carried by said cradle; and means for laying the cord on to the spool or drum, the organization being such that two twists are given to the cord for each revolution of the flier.

46. The combination with a single rotary flier receiving and delivering the cord endwise of itself, of mechanism for rotating the flier; a spool or drum located within said flier; a cradle mounted within said flier; means for holding said cradle stationary; means for imparting rotary movement to the spool or drum and organized to permit a variable movement thereof; pull-down mechanism located upon said cradle and effective to feed the cord to the spool at a predetermined rate of speed; and reciprocatory means carried by the cradle for laying the cord on to the spool or drum, the organization being such that two twists are given to the cord for each revolution of the flier.

47. The combination with a single rotary flier receiving and delivering the cord axially of itself, of mechanism for rotating the flier; a spool or drum located within said flier, said drum having its axis of rotation in a plane parallel to the axis of rotation of the flier; a cradle mounted within said flier; means for holding said cradle stationary; means for imparting rotary movement to the spool or drum and organized to permit a variable movement thereto; pull-down mechanism located upon said cradle and effective to feed the cord to the spool at a predetermined rate of speed; and reciprocatory means carried by the cradle to lay the cord on to the spool or drum, the organization being such that two twists are given to the cord for each revolution of the flier.

48. The combination with a rotary flier, of a spool or drum located therein with its axis of rotation in a plane parallel to the axis of rotation of the flier; a stationary cradle located within the flier; means for holding said cradle against rotation; pull-down mechanism carried by said cradle and effective to feed the cord to the spool or drum at a predetermined rate of speed; and means for rotating said drum.

49. The combination with a rotary take-up flier, of a reel or drum located within said flier; a cradle also located within the flier and extending longitudinally thereof; means for maintaining the cradle stationary; reciprocatory means carried by the cradle for laying up the cord upon the reel; and means also carried by the cradle for receiving the cord from the flier and feeding it to the laying-up means at a uniform rate of speed.

50. The combination with a single rotary take-up flier receiving and delivering the cord endwise of itself, of means for rotating said flier; a take-up drum located in and lengthwise of the flier; means for rotating the drum; and including means for controlling the speed of the drum; means stationary with relation to said flier for laying up the cord upon the drum; and means located within the flier and stationary with relation thereto for supplying the cord to the laying up means at a uniform rate of speed, the organization being such that two twists are given to the cord for each revolution of the flier.

51. The combination of a rotary flier, a drum located therein, laying on means comprising a reciprocatory carriage and a finger having spring prongs to permit the passage of a knot or imperfection in the cord.

52. A pull-down mechanism comprising a pair of rolls spaced apart, said rolls having grooves and each having a track and an intermediate roll mounted in said track for bodily movement in and out between said pair of rolls, the cord straddling such bodily movable roll.

53. A pull-down mechanism comprising a pair of rolls spaced apart, said rolls having grooves and each having a track, a loosely mounted roll adjacent to one of said rolls and an intermediate roll mounted in such tracks for bodily movement in and out between said pair of rolls, the cord straddling such bodily movable roll.

54. In a cordage machine, the combination with a flier having journals extending inwardly thereof, a cradle supported by said journals, a take-up bobbin located within said flier, reciprocating laying on means for the bobbin, means carried by one of said journals for imparting movement to said bobbin and said laying-on means, pull-down mechanism located within the flier, and means carried by the other of said journals for operating said pull down mechanism, the organization being such that two twists are given to the cord for each revolution of the flier.

55. In a cordage machine, the combination with a flier having journals extending inwardly thereof, a cradle supported by said journals, a take-up bobbin located within said flier, reciprocating laying on means for the bobbin, means carried by one of said journals for imparting movement to said bobbin and to said laying-on means, pull-down mechanism located within the flier, means carried by the other of said journals for operating said pull down mechanism, the organization being such that two twists are given to the cord for each revolution of the flier, and a slicker carried by the journal carrying the pull-down operating means.

56. In a cordage machine, the combination of a flier having journals extending inwardly thereof, a cradle supported thereby, a take-up bobbin located within said flier, means for frictionally operating said take-up bobbin and embodying means carried by one of said journals, a reciprocating laying-on means for the bobbin, pull-down mechanism located within the flier, and means carried by the other journal of said flier for operating said pull-down mechanism, the organization being such that two twists are given to the cord for each revolution of the flier.

57. In a cordage machine, the combination of a flier having journals extending inwardly thereof, a cradle supported thereby, a take-up bobbin located within said flier, means for frictionally operating said take-up bobbin and embodying means carried by one of said journals, a reciprocating laying-on means for the bobbin, pull-down mechanism located within the flier, means carried by the other journal of said flier for operating said pull-down mechanism, the organization being such that two twists are given to the cord for each revolution of the flier, and a slicker carried by said last mentioned journal for smoothing the cord.

58. In a cordage machine, the combination of a rotary take-up flier having journals extending inwardly thereof; a cradle supported thereon, a pull-down mechanism located within said flier, a bobbin, means for laying up the cord thereon, a gear carried by one of said journals for operating said pull-down mechanism, and a gear carried by the other of said journals for driving the bobbin and laying up means.

59. In a cordage machine, the combination with a rotary take-up flier, of a cradle held stationary within the same, means for holding said cradle stationary, a frictionally driven take-up bobbin, reciprocating laying up means for such bobbin, a positively acting pull-down for feeding forward the cord at a fixed uniform speed, the whole being actuated through the medium of the flier, and the organization effective to give two twists to the cord at each rotation of the flier.

60. In a cordage machine, the combination with a rotary take-up flier, a stationary hanging cradle located therein, a bobbin located within said flier, a reciprocatory laying on device, and a pull-down device for feeding the cord uniformly, all of said devices being carried by the cradle.

61. The combination of a rotary flier, a cradle supported therein, a positively acting pull-down mechanism supported on said cradle and effective to pull down and feed the cord uniformly and gearing for imparting motion from the flier to the pull-down mechanism.

62. In a cordage machine, the combination with a take-up flier having its journals extending inwardly thereof, of a stationary cradle located within said flier; means for maintaining the cradle stationary; a frictionally operated bobbin located within the flier, reciprocating means for laying the cord up upon said bobbin, pull-down mechanism also located within the flier, said cradle being supported by the journals, and said bobbin, pull-down mechanism and laying-up means being supported by the cradle, and means carried by one of said journals for operating the bobbin and reciprocating feeding means; and means carried by the other of said journals for operating the pull-down mechanism; the organization being such that two twists are given to the cord for each rotation of the flier.

63. In a cordage machine, the combination with a take-up flier having its journals extending inwardly thereof, of a stationary cradle located within said flier; planet gearing for holding the cradle stationary, a frictionally operated bobbin located within the flier, reciprocating means for laying the cord up upon said bobbin, pull-down mechanism also located within the flier, said cradle being supported by the journals and said bobbin, pull-down mechanism and laying up means being supported by the cradle, and means carried by one of said journals for operating the bobbin, and reciprocating feeding means; and means carried by the other of said journals for operating the pull-down mechanism; the organization being such that two twists are given to the cord for each rotation of the flier.

64. The combination with a flier having a head, of means for rotating the flier comprising a fast and a loose pulley, and a belt shifting device operative upon severing of the cord and comprising an arm arranged to reciprocate, which arm projects through said head in engagement with the cord intermediate of the head and the end of the arm.

65. A combined twisting and balling mechanism, comprising in combination in one single structure, a rotary flier, a drum or spool located therein, a cradle stationary within the flier and extending below the spool, a worm shaft carried thereby, a reciprocating carriage mounted upon said shaft, an upright swinging member stationarily carried within the flier by said carriage and extending perpendicularly at one side of said spool and having guiding means for guiding the cord to the spool, the position of said member with relation to the spool being controlled entirely by the tension of the cord, and a positively acting pull down arranged to receive the cord after its passage from the flier, said swinging member being organized and constructed to receive the cord immediately after it leaves the pull down.

66. A combined twisting and balling mechanism, comprising in combination in one single structure, a rotary flier, a drum or spool located therein, a reciprocating carriage supported within said flier below the spool, means for holding said carriage against rotation with the flier, means for reciprocating said carriage, an upright swinging finger carried stationarily within the flier by said carriage and extending perpendicularly at one side of said spool for guiding the cord to the spool, said finger being entirely controlled in its movement toward and from the drum by the tension of the cord, and a positively acting pull down constructed and arranged to receive the cord after its final passage from the flier, said swinging finger being constructed and arranged to receive the cord directly after leaving the pull down.

67. A combined twisting and balling mechanism comprising in combination in one single structure, a rotary flier, a drum or spool located therein, a cradle within the flier and extending below the spool, a worm shaft carried thereby, a reciprocating carriage mounted on said shaft, an upright swinging member stationarily carried within the flier by said carriage and extending perpendicularly at one side of said spool and having a pair of guiding devices located relatively remote from each other and one adjacent to each end of said member for guiding the cord to the spool, the position of said member with relation to the spool being controlled entirely by the tension of the cord, and a positively acting pull down constructed and arranged to receive the cord after its final passage from the flier, said guiding devices being constructed and arranged to receive the cord directly after leaving the pull down.

68. The combination with a single rotary flier, of a drum or spool located therein, of a belt mechanism for rotating said flier, a stationary cradle also located within said flier, a reciprocating mechanism carried thereby, a cord carriage carried by said reciprocating mechanism, and a swinging member carried by said carriage and having guiding means for laying the cord onto said spool.

THOMAS WOOD NORMAN.

Witnesses:
RICHARD DELANEY,
JOSEPH E. MANNING.